United States Patent [19]
Wentz

[11] 3,741,626
[45] June 26, 1973

[54] COMMUNICATION
[75] Inventor: John L. Wentz, Ellicott City, Md.
[73] Assignee: Westinghouse Electric Corporation, Pittsburgh, Pa.
[22] Filed: Aug. 18, 1971
[21] Appl. No.: 172,850

[52] U.S. Cl. .............................. 350/150, 350/160
[51] Int. Cl. ............................................ G02f 1/26
[58] Field of Search.................... 350/147, 150, 157, 350/160

[56] References Cited
UNITED STATES PATENTS

| 3,614,200 | 10/1971 | Taylor................................ 350/150 |
| 3,644,017 | 2/1972 | Ploss................................ 350/160 R |
| 3,497,831 | 2/1970 | Hickey et al........................ 350/150 |
| 3,027,806 | 4/1962 | Koelsch, Jr. et al.................. 350/150 |
| 3,349,677 | 11/1967 | Young ............................... 350/150 |
| 3,515,887 | 6/1970 | Rosenberg et al..................... 350/150 |

Primary Examiner—Ronald L. Wibert
Assistant Examiner—Michael J. Tokar
Attorney—F. H. Henson et al.

[57] ABSTRACT

There is disclosed apparatus and a method for producing a selected visual pattern. A colliminated linearly-polarized laser beam of radiation, is passed in succession through, and subdivided into a matrix of potentially visual elements by, a pair of matrices of coextensive light-modulating cells, each cell matrix formed by crossed arrays of electro-optic crystals disposed with their optic axes at right angles to the beam and at right angles to each other. Voltage is impressed on selected crystals of each array of the first matrix to produce a phase shift of 90° in the plane of polarization of the elements of the beam passed by these selected crystals. The beam emerging from the first cell matrix is passed through a linear polarizer whose polarization is in the same plane as the incident beam, the polarizer passes only elements of the beam which were modulated by crystals of both arrays and unmodulated elements. Voltage is impressed on crystals of each array forming the second matrix which are coextensive with the selected crystals of the first matrix; this voltage shifts the plane of polarization of the beam elements passed by both crystals of the second matrix by 90°. The beam emerging from the second matrix is passed through a polarizer whose plane of polarization is at 90° to the polarization of the incident beam. Only the elements of the beam which pass through the crystals of all four arrays emerges.

12 Claims, 9 Drawing Figures

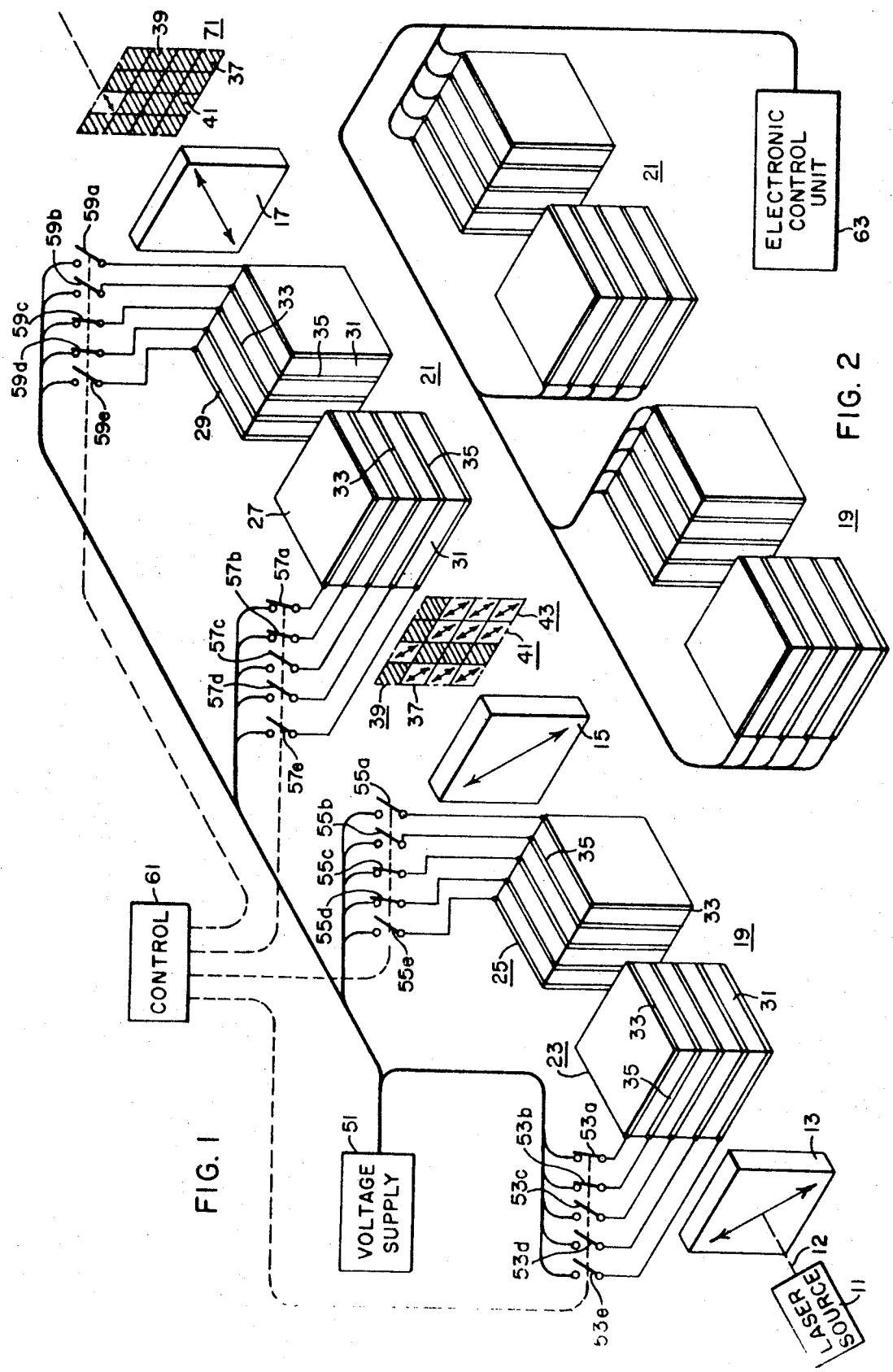

COMMUNICATION

CROSS REFERENCE TO RELATED PATENTS

U.S. Pat. No. 3,429,636 is incorporated herein by reference.

BACKGROUND OF THE INVENTION

This invention relates to the communication art and has particular relationship to communication by generating selected moving matrix arrays or patterns of radiation for use in display systems and in scanning, typically, optical display and scanning by a beam of light in the wavelength range between 0.2 microns and 20 microns. Many of the purposes for which such selected matrix arrays and patterns are uniquely suitable, because they can be more readily adapted than other facilities, demand that the scanning shall be over a wide field and at very high speeds and it is an object of this invention to provide for the generation of such suitable arrays and patterns.

In accordance with the teachings of the prior art particularly where large-field scanning is desirable a beam of radiation may be deflected to produce a scanning pattern by electro-mechanical devices. However, the frequency of scanning of which such devices are capable is inherently limited to lower magnitudes. Piezoelectric transducers can also be used for deflecting a beam of radiation to scan but with such device, the field or area of scanning must be maintained at very low magnitudes.

It is an object of this invention to overcome the disadvantages of the prior art and to provide communication apparatus and a method of communication in which intelligence is conveyed by causing a beam of radiation to scan to produce a predetermined moving, matrix or pattern and in the use and practice of which the scanning shall be carved out over large fields and at high, electric speeds.

SUMMARY OF THE INVENTION

In accordance with this invention, the scanning pattern is produced by arrays of electro-optic crystals or shutters such as are disclosed in U.S. Pat. No. 3,429,636. This patent discloses the cooperation of a pair of such crystals which are coextensive or aligned along a beam of light and which may be regarded as an electro-optic cell. Correspondingly the arrays of crystals in accordance with this invention cooperate in pairs, each pair being composed of a number of cells each cell including a pair of intersecting or coextensive or aligned crystals.

The radiation which is to form the desired matrix array or is to scan a region or area is passed through the arrays of cells. The scanning is produced by applying electric fields to selected crystals of the arrays, the field being switched from certain crystals to other crystals in each array in accordance with the desired matrix array or scanning pattern. To achieve high-speed change of the matrix array in high-speed scanning the changing impressing of voltage in the selected crystals is electrically controlled. The field or area of scan may be set to a large magnitude by providing arrays of crystals of appropriate dimensions. While this invention is uniquely advantageously embodied in apparatus in which the radiation beam is a coherent monochromatic beam derived from a laser, it is also applicable to systems in which the radiation is a collimated beam derived from an ordinary source. Where the radiation is derived from a laser beam the beam may be modulated by Q-spoiling as taught by Patent 3,429,636 to achieve the intelligence communication purpose of the apparatus.

In the practice of this invention the radiation is transmitted in succession through the cells or shutters of two sets of arrays of electro-optic crystals. All crystals are disposed in the beam with their optic axes, or Z axes perpendicular to the beam, and with the optic axes of the crystals of an array of each set perpendicular to the optic axes of the crystals of the other array. The radiation incident on the first array of the first set is polarized and the resulting radiation emitted by the last array in the succession of each set is passed through a polarizer. Voltage is impressed on selected crystals of the arrays which is of such magnitude and is so controlled that at each array the polarization of the radiation in selected portions of the cross section of the incident radiation on each array is changed. The changes are so coordinated with each other and with the planes of polarization of the polarizers that the portions of the resulting beam emitted by the last polarizer have a predetermined matrix array. The matrix array can be subjected to time variation by suitable variation of the voltages impressed on the crystals to produce a high-speed scanning operation over a large area.

Typically this invention may be applied to a radar system. In this case the beam of radiation is appropriately modulated to produce pulses and the voltages on the crystals are varied so that the region under observations are scanned by impingement of successive portions of the beam. Resulting radiation reflected from objects in the region under observation is processed by a radiation receiver synchronized and coordinated with the control of the voltages which produce the transmitted radiation.

The invention may also be to serve for high-speed printing. In this case the crystals are controlled so that the portions of the beam emitted by the last polarizer form symbols such as letters or numbers. The radiation emitted by these portions, particularly if it is derived from a laser, may record the symbols onto a tape or the like.

BRIEF DESCRIPTION OF THE DRAWING

For a better understanding of this invention, both as to its organization and as to its method of operation, together with additional objects and advantages thereof, reference is made to the following description taken in connection with the accompanying drawings; in which:

FIG. 1 is a diagrammatic view showing an embodiment of this invention;

FIG. 2 is a fragmental view of FIG. 1 showing how this invention may be practiced to produce matrix arrays which change at a high rate or to produce high speed scanning;

DETAILED DESCRIPTION OF INVENTION

Figure 3:
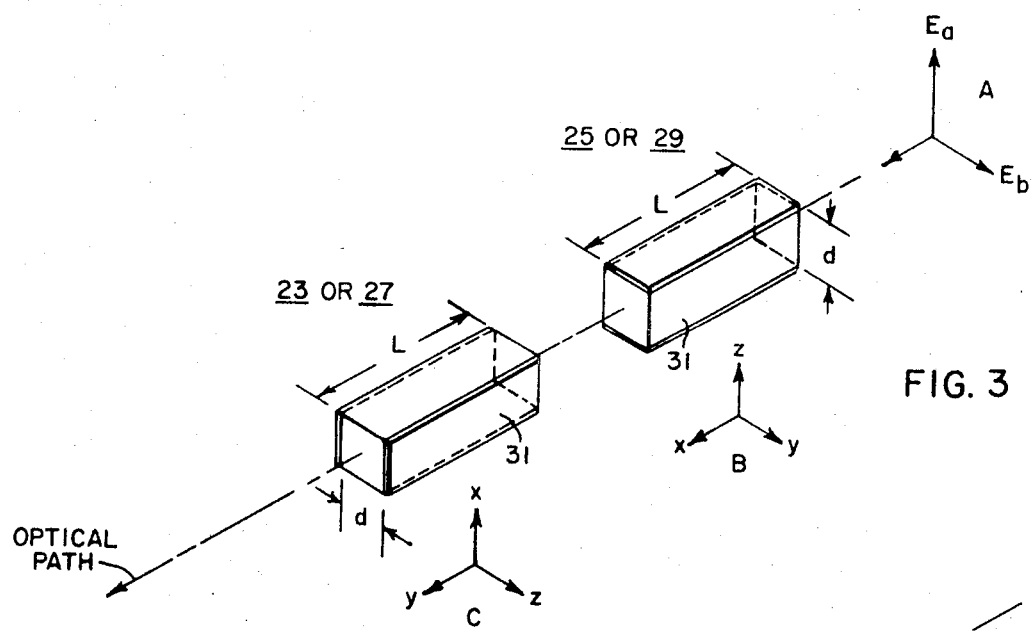
FIGS. 3 and 4 show different orientations of crystals of typical cells and serve the purpose of explaining the practice of this invention.

The apparatus shown in FIG. 1 includes a laser source 11, as disclosed in Patent 3,429,636 for producing a coherent beam 12 of monochromatic radiation. In the path of the beam 12 from the laser 11 are polarizers 13, 15, 17 and sets 19 and 21 of shutter arrays 23 and 25 and 27 and 29 of electro-optic crystals 31. The polarizers 13, 15, 17 and the arrays 23, 25, 27, 29 are of substantially the same cross-sectional area and the cross-sectional area of the beam 12 is such that it extends over the cross-sectional area of the polarizers and arrays.

The arrays 23–29 are disposed with the optic axes of the crystals 31 substantially perpendicular to the beam 12 and with the optic axes of the crystals of arrays 23 and 27 and 25 and 29 respectively, substantially perpendicular to each other. The surfaces of each crystal 31 which are parallel to the light path are provided with highly electrically conducting electrodes 33 and 35. The electrodes 33 and 35 may be provided by coating the surfaces.

The projections of the coated surfaces of the electrodes 33 and 35 of each pair of arrays 23 and 25 and 27 and 29 sub-divide the beam 12 into cross-sectional portions 37 which extend in rows 39 and columns 41 and shown by the patterns in squares 43 and 71 in FIG. 1.

Only four crystals 31 are shown in each array to facilitate explanation of the invention. In the usual practice of this invention each array includes a large number of crystals with the spacing between successive crystals 31 as small as is achievable within the state of the art of electro-optical crystal fabrication, typically of the order of a millimeter or less.

The polarizer 13 causes the resulting beam which is transmitted to array 23 to be linearly polarized. Polarizer 15 produced polarization in the same plane as polarizer 13 and polarizer 17 produced polarization in a plane substantially perpendicular to the planes of polarization of polarizers 13 and 15.

The apparatus shown in FIG. 1 includes a voltage supply 51, for impressing voltages across selected cells 31 of the arrays 23 through 29 respectively. The supply 51 is connected to the electrodes 33 and 35 of selected cells 31 through switches 53a, 53b, 53c, 53d, 53e; 55a through 55e; 57a through 57e; and 59a through 59e which may be selectively closed or left open by operation of a control 61. As shown in FIG. 1, switches 53a and 53b and 57a and 57b for cells 31 of arrays 23 and 27, which are coextensive along the laser beam, and switches 55c and 55d and 59c and 59d for cells 31 of arrays 25 and 29, which are coextensive along the beam, are closed. The other switches 53c, d, e; 57c, d, e; 55a, b, e; and 59a, b, e are open.

Although for some purposes actual mechanical switches or relay contacts may serve to apply the voltages to the selected cells 31, the practice of this invention usually demands high speed electronic switching. The mechanical switches are shown in FIG. 1 to facilitate explanation of the invention. In the usual practice of this invention the voltages are impressed as shown in FIG. 2 by operation of an electronic control unit 63 which applies and changes the voltages at electronic speeds. The unit 63 may be an appropriately programmed computer.

To gain an understanding of the function and operation of the arrays of cells of crystals 31 in the practice of this invention, the following description of typical operation is given. The crystals 31 operate in pairs; a crystal from array 23 or 27 of set 19 cooperating with the intersecting or coextensive crystal of array 25 or 29 respectively of set 21. FIG. 3 shows diagrammatically the parts at the intersection of a pair of such intersecting crystals 31 including a horizontal crystal of arrays 23 or 27 and a vertical crystal of arrays 25 or 27. The remainder (not shown) of the crystal from array 23 or 27 extends horizontally and the remainder (not shown) of the crystal from arrays 25 or 29 extend vertically. For brevity this explanation will confine itself to one set of arrays referring to the intersecting or coextensive crystals as crystals I and II. Coordinate system A represents the incident radiation which consists of orthogonal polarization electric vector components $E_a$ and $E_b$, coordinate system B represents the orientation of crystal I, and coordinate system C represents the orientation of crystal II. Crystals I and II are electro-optical crystals; and, for this particular discussion, uniaxial electro-optical crystals are assumed. However other types of electro-optical crystals may be employed with the same end results. The coordinate systems B and C for crystals I and II shown in FIG. 3 are not unique to this invention, and the crystal coordinate orientation combinations shown in FIG. 4 may be substituted for the crystal orientations shown in FIG. 3 without altering the performance of this invention. Selection of a particular crystal orientation combination will require proper selection of voltage polarity (or phase relationships for alternating current) applied to the crystals I and II to obtain the desired electro-optical effects. With reference to FIG. 3, each cell of crystals 31 may consist of two potassium dideuterium phosphate uniaxial electro-optical crystals. The axes shown in FIG. 3 are the axes of the index ellipsoid when electric field is applied along the z axis. It is seen that the crystals are oriented with their z axes transverse to the optical path and perpendicular to each other. For an incident light beam linearly polarized at 45° to the y axis and z axis of crystal I and/or the Z axis and X axis of crystal II and propagating along the optical path shown, the following relationships characterize the phase retardation induced by the crystals: Resolving the input light polarization into orthogonal components $E_a$ and $E_b$ parallel to the x and z or z and y axes, respectively it is seen that $$\phi_a = (2\pi L/\lambda)(n_z + n_x) + \alpha \text{ radians}$$
$$\phi_b = (2\pi L/\lambda)(n_y + n_z) + \alpha \text{ radians}$$

(1)

where $\phi_a$ and $\phi_b$ are the total phase changes for the components $E_a$ and $E_b$, respectively, in traversing the crystals; $n_x$, $n_y$ and $n_z$ are the indexes of refraction for light vibrating parallel to the x, y, and z axes, respectively; $\lambda$ is the free-space wavelength of the incident light; L is the length of each crystal along the optical path; and $\alpha$ is the phase change for each component, $E_a$ and $E_b$, in traversing the isotropic medium between the crystals. Depending on the length L $\phi_a$ and $\phi_b$ may be a large number of radians, in some cases thousands of radians. However the effect on the polarization of the light beam is cycles repeating itself every $2\pi$ radians. The practice of this invention depends on the number of radians which remain in $\phi_a$ or $\phi_b$ after the last full cycle before the beam emerges from crystal I or II. The important relationship in this analysis is the phase difference between the emerging components given by $$\Delta\phi = \phi_a - \phi_b = (2\pi L/\lambda)(n_x - n_y) \text{ radians} \tag{2}$$

When an electric field is applied along the z axes of the crystals the magnitudes of the respective refractive indexes are given by $n_x \rightarrow n_o \pm \Delta n$
$n_y \rightarrow n_o \mp \Delta n$
$n_z = \text{constant} = n_e$ where $$\Delta n = (r_{63} n_o^3 V_z/2d) \tag{3}$$

$\Delta n$ = change in index of refraction as a function of voltage
$n_o$ = ordinary index of refraction
$n_e$ = extraordinary index of refraction
$r_{63}$ = electro-optic coefficient a constant for a given crystal
$V_z$ = voltage applied parallel to z axis
$d$ = crystal thickness along the z axis Substituting the above expression for $n_x$ and $n_y$ into equation 2 gives the phase difference between the emerging components as $$\Delta\phi = (2 r_{63} n_o^3/\lambda) \cdot (L/d) \cdot V_z \text{ radians} \tag{4}$$

With $V_z = 0$, $\Delta\phi = 0$ and the original polarization is preserved. However, when voltage is applied to the crystals, an elliptically polarized wave emerges from the crystals or cell with the eccentricity and orientation of major and minor axes dependent upon the applied voltage.

Of interest is the voltage necessary to produce a 90° rotation of the polarization of the incident light beam. This voltage is found by setting $\Delta\phi$ equal to $\pi$ radians and solving for $V_z$. Solving equation 4 there is obtained $$V_{\lambda/2} = (\lambda/2r_{63}n_o^3) \cdot (d/L) \text{ volts} \tag{5}$$

This voltage is known as the half wave voltage since when applied it produces a 180° phase difference between the emerging components, $E_a$ and $E_b$. Also it is of interest to know that application of twice the half-wave voltage will result in a 180° rotation of polarization which is the same polarization which is obtained when zero voltage is applied to the cell.

It is to be noted that in general to achieve a desired $\Delta\phi$ for a cell the voltages may be applied in any appropriate relationship to both coextensive crystals 31 of the cell.

The voltages impressed on the cells of the pairs of crystals 31 of arrays 23 and 25 are the so-called full-wave voltages, each sufficient to induce a phase change, $\Delta\phi$ of $\pi$ radians or 180° in the electric-vector component of the incident radiation which is perpendicular to the impressed voltage.

Figure 5:
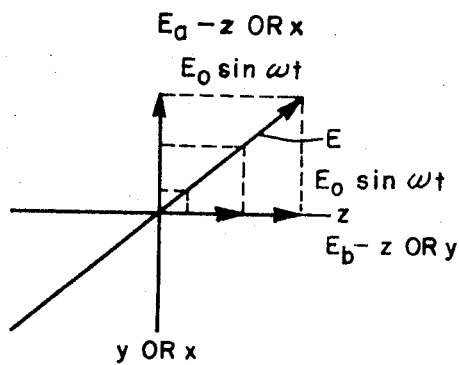
FIGS. 5, 6 and 7 show the manner in which the changes in polarization are produced.
Figure 6:
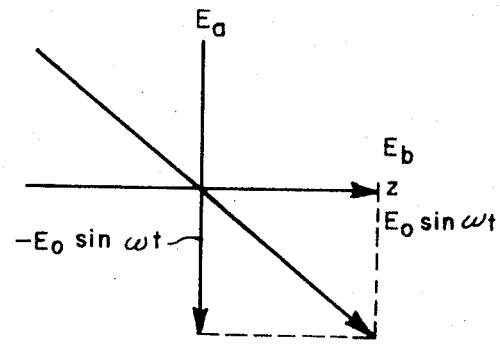

FIGS. 5 and 6 show the effects, on the polarization of a beam emitted by a cell, of crystals 31 which are produced by this $\Delta\phi$ of 180°.

The electric vector of the beam incident on the cell may be resolved as shown in FIG. 3 into components $E_a$ and $E_b$. These components vary sinusoidally in magnitude at the frequency of the radiation. In magnitude each $E_a$ and $E_b = E_o \sin wt$ at any instant for a linearly polarized incident beam. As $E_a$ and $E_b$ vary their resultant E varies in magnitude but its direction remains at 45° to $E_a$ and $E_b$. The effect of the field impressed on selected voltage-affected crystals of array 23 and array 25 is to induce a phase change of 180° in either component $E_a$ and/or $E_b$ on the cells 31 composed of the selected crystals. For the purpose of this explanation it may be assumed that for a cell in which only one crystal is voltage affected $E_b$ remains $E_o \sin wt$ while $E_a$ becomes $E_o \sin (wt + 180°) = -E_o \sin wt$. As shown in FIG. 6, the resultant E is now linearly polarized but its plane of polarization is at right angles to the plane of the incident resultant E as shown in FIG. 3. The effect on a beam passing through cells of successive crystals 31 which together are subject to the full-wave voltage is to induce a phase change of 360° between $E_a$ and $E_b$ so that the plane of polarization of the beam is reverted to the original setting as shown in FIG. 3.

The effect of the voltages on the selected cells of the arrays 23 and 25 and of the polarizer 15 is shown in square 43. The planes of polarization of the strip of radiation passing through the upper crystal 31 of the first array 23 and the coextensive or intersecting second crystal 31 from the left of the second array 25 are displaced by 180° so that the radiation from this strip alone would be suppressed by polarizer 15. But the polarization of the strip of the radiation which passes through the cells of both arrays 23 and 25, whose crystals are subject to voltages producing a total shift of 360° pass through polarizer 15. The radiation passed through the cells whose crystals 31 are not subject to the voltage is also passed by the polarizer 15. The result is that the cross-sectional component of radiation defined by the intersections of the projections of the boundaries of the upper crystal 31 of the first array and the second crystal from the left of the secondary array is passed as shown by the block in the first row and the second column from the left of square 43 and other radiation from these voltage-affected cells is suppressed, as shown by the shaded blocks of square 43. As shown the radiation through all other cross-sectional components is passed.

Figure 7:
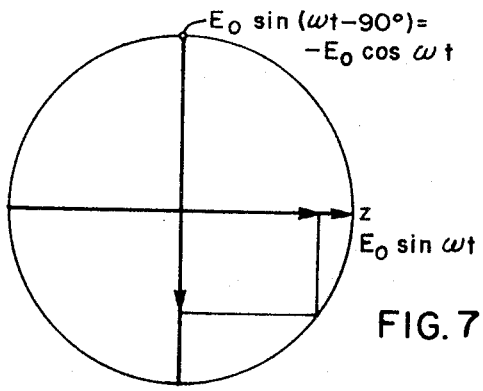

The intersecting crystals 31 of arrays 27 and 29 function as cells but the appropriate voltages are impressed on the crystals of each array as shown by FIG. 1 to achieve the desired $\Delta\phi$. The voltage impressed on the selected crystals 31 of arrays 27 and 29 is such that the induced phase difference, $\Delta\phi$, between the electric-vector components of radiation passing through a cell of array 27-29 having only one crystal on which voltage is impressed, would be substantially less than $\pi$ radians, but the induced $\Delta\phi$ between the electric-vector component of radiation passing through a cell, both of whose crystals 31 have voltage impressed thereon, would be $\pi$ radians. For convenience each selected crystal of a cell may be considered subjected to so-called half-wave voltage which would induce a phase difference of 90° or $\pi/2$ radians between the orthogonal components of radiation for each cell having only one crystal subject to voltage if there were incident radiation at such a cell. The polarization produced is shown in FIG. 7 and is seen to be circular. It is a feature of this invention that the radiation whose polarization would become circular is suppressed by the cooperation of arrays 23 and 25 and polarizer 15 (shaded areas of pattern 43) so that the effect of the circular polarization does not appear in the output pattern.

As shown in FIG. 1 the voltage is impressed on the cells of the arrays 27 and 29 which are coextensive along the beam 12 with the cells of the arrays 23 and 25 respectively on which voltage is also impressed. The radiation, corresponding to the shaded blocks of square 43, whose polarization would be changed from plane to circular by the arrays 27 and 29 is then suppressed and arrays 27 and 29 have no effect on it. The radiation corresponding to the unshaded block in the first row and second-from-the-left column of square 43 passes through a cell of arrays 27 and 29 both of whose crystals 31 are subject to voltage and the plane of polarization of this strip of radiation is displaced by 90°. This strip of radiation is passed through polarizer 17 and is represented by the only unshaded block of square 71. The radiation corresponding to the other unshaded blocks of square 43 passes through cells of arrays 27 and 29 whose crystals are not subjected to voltage and these strips are suppressed by analyzer 17.

A selected portion of the radiation is thus passed. By proper variation of the voltages on the cells 23 through 29 the passed portion of the radiation can be made to scan the cross-sectional portion of the beam corresponding to square 71 and thus scan the region covered by this cross section. Such scanning would be carried out by a radar system in accordance with this invention.

Figure 8A:
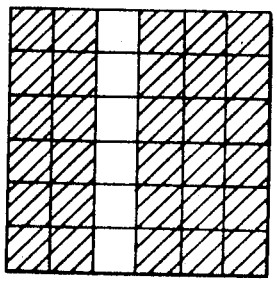
FIGS. 8A and 8B show matrix patterns produced when this invention is applied to high speed printing.
Figure 8B:
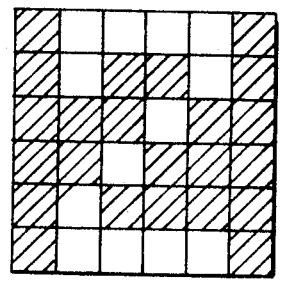

For printing in the practice of this invention selected cells of the arrays 23–29 can be subjected to voltage to produce letter patterns. FIGS. 8A and 8B show such patterns produced with a system made up of arrays of 36 cells each. The number 1 is produced by passing the radiation through portions defining a line in the cross section of the beam 12 as shown in FIG. 8A. The number 2 may be correspondingly produced as shown in FIG. 8B. The portion of the beam transmitted may turn the symbols into a tape.

In the practice of this invention the crystals 31 may be composed of potassium dihydrogen phosphate (KDP) crystals. Typically such crystals may be assembled in an array of 1,000 crystals, two arrays producing a cross section of one million blocks 37; that is, one million cells. The driving full-wave or half-wave voltage depends on the length of the cell through which the radiation is passed but typically is 640 volts for the full-wave voltage and 320 for the half-wave voltage. KDP crystals can withstand a voltage of about 25,000 per centimeter so that 640 volts is well within the capabilities of cells having a width of one millimeter. If the crystals of arrays 23 and 25 are twice as long along the beam 12 as the crystals of the arrays 27 and 29 all arrays can be operated at 320 volts. Where desirable fiber optical tubes may be disposed to receive the output of the apparatus at polarizer 17.

While a preferred embodiment has been disclosed herein, many modifications thereof are feasible. This invention then is not to be restricted except insofar as is necessary by the spirit of the prior art.

I claim:

1. Apparatus for producing a predetermined pattern of radiation including means for producing an incident beam of linearly polarized radiation, first and second arrays of electro-optic crystals disposed in succession in the path of said beam with the optic axes (Z axes) of the crystals of both arrays generally perpendicular to said beam and with the optic axes of the crystals of one array generally perpendicular to the electro-optic axis of the other, the portion of said beam passed by each crystal of said first array being capable of passing through a plurality of crystals of the second array, coextensive crystals of said arrays along the beam forming electro-optic cells, first means, connected to at least one selected crystal of said first array, for impressing a phase change of substantially $\pi$ radians on one of the electric-field-vector components of the portion of said beam passing through said one crystal, second means, connected to at least one selected crystal of said second array, for impressing a phase change of substantially $\pi$ radians on one of the electric-field-vector components of the portion of said beam passed by said first array through said second array, the electric-field-vector component of the portion of said beam passed through the cell including the selected crystal of said first array and the selected crystal of said second array being subjected to a phase change of substantially $2\pi$ radians and remaining linearly polarized in the same plane as said incident beam and the electric-field-vector components of the portions of said beam passed by a cell including only one of said selected crystals being subjected to a phase change of substantially $\pi$ radians and being polarized in a plane at right angles to the plane of polarization of the incident beam, first polarizer means interposed in the path of the resulting beam passed by said second array, said polarizer means passing radiation whose plane of polarization is substantially the same as that of said incident beam, third and fourth arrays of electro-optic crystals interposed in succession in the path of the resulting beam passed by said first polarizer means with their optic axes generally perpendicular to said last-named resulting beam and with the optic axes of the crystals of said third array generally perpendicular to the optic axes of the crystals of said fourth array, any portion of said beam passed by each crystal of said third array being capable of passing through a plurality of crystals of said fourth array, coextensive crystals of said third and fourth arrays along the beam forming electro-optic cells, third means, connected to at least one selected crystal of said third array, which crystal is in the path of, and is, capable of passing that portion of the last-named resulting beam, if any, derived from the portion of the beam passed by the selected crystal of the first array, for impressing a phase-change substantially less than $\pi$ radians on one of the electric-field-vector components of the portion of the beam, if any, passed by said last-named selected crystal of said third array, fourth means, connected to at least the one selected crystal of said fourth array, which is capable of passing the resulting beam, if any, passed by said third array, which portion is derived from the portion of this beam transmitted by the selected crystal of the second array, for impressing a phase change on one of the electric-vector components of the portion of the beam, if any, passed by said selected crystal of said fourth array, such that the total phase change impressed on any portion of the beam passed by the cell including the selected crystal of the third array and selected crystal of the fourth array is substantially $\pi$ radians, whereby the plane of polarization of the last-named portion of the resulting beam transmitted by said selected crystal of said fourth array is generally at right angles to the corresponding portion of the resulting beam incident on said selected crystal of said third array, and second polarizer means interposed in the path of the resulting beam transmitted by said fourth array, the plane of polarization of the radiation transmitted by said second polarizer means being generally at right angles to the plane of polarization of said incident beam.

2. Apparatus for producing a pattern of radiation, comprising means for producing an incident beam of linearly polarized radiation, a first array of electro-optic crystals in radiation-receiving relationship with said beam and with their optic axes, herein called Z axes, generally perpendicular to said beam, said array emitting a first resulting beam, a second array of electro-optic crystals in radiation-receiving relationship with said first resulting beam, said second array being disposed with their Z axes generally at right angles both to said first resulting beam and to the Z axes of said first array, said second array emitting a second resulting beam, coextensive pairs of crystals, of the first and second arrays, along the incident and resulting beams of radiation forming electro-optic cells, means connected to the crystals of first selected cells of said first and second arrays for producing a displacement of about 90° in the plane of polarization of those parts of the first resulting beam emitted by said first selected cells with reference to the plane of polarization of the corresponding parts of the incident beam, said means being also connected to the crystals of at least one second selected of the cells of said first and second arrays, for producing a displacement of about 180° in the plane of polarization of the part of the second resulting beam emitted by the last-named selected cells with reference to the plane of polarization of the corresponding part of the incident beam, a first polarizer means capable of transmitting substantially only radiation having the polarization of said incident beam disposed in radiation-receiving relationship with said second resulting beam, said polarizer means being capable of emitting a third resulting beam of radiation, from which the portions of the incident beam passed only by said first selected cells are suppressed, and the portions of the incident beam passed by said second selected cells is transmitted, a third array of electro-optic crystals in radiation-receiving relationship with said third resulting beam and with their Z axes generally perpendicular to said third resulting beam, said third array emitting a fourth resulting beam, a fourth array of electro-optic crystals in radiation-receiving relationship with said fourth beam and with their Z axes generally perpendicular to said fourth beam and to the Z axes of the crystals of the third array, said fourth array emitting a fifth resulting beam, means connected only to the crystals of third selected cells of the third and fourth array, which are coextensive along the second, third, fourth and fifth beams with the second selected cells, for polarizing the parts of said fifth resulting beam passed by said third selected cells in a plane at right angles to the plane of polarization of the part of the third selected cells which is incident on said third selected cells, and second polarizer means capable of transmitting plane polarized radiation, whose plane of polarization is generally perpendicular to the plane of polarization of said last-named incident is part of the beam, disposed in radiation-receiving relationship with said fifth resulting means, said second polarizer means passing only the parts of the radiation of said fifth resulting beam passed by said third selected cells.

3. The method of producing a predetermined pattern of radiation from an incident linearly-polarized beam, the said method comprising the steps of subdividing said beam into a matrix of elements, producing a first resulting beam including first linearly-polarized elements of said matrix whose plane of polarization is unchanged, second linearly polarized elements of said matrix, whose plane of polarization is substantially at right angles to the plane of polarization of the incident beam and third linearly polarized elements of said matrix whose plane of polarization has been rotated substantially through 360° and is the same as that of said incident beam, modifying the first resulting beam by suppressing said second elements to produce a second resulting beam in which said second elements are suppressed, producing a third resulting beam including fourth linearly polarized elements of said matrix whose polarization is unchanged and fifth linearly polarized elements of said matrix whose plane of polarization is substantially at right angles to the plane of polarization of the incident beam, while suppressing the remaining portion of said second resulting beam, said fourth elements being coextensive with said first elements and said fifth elements being coextensive with said third elements, and producing a fourth resulting beam including only said fifth elements.

4. The apparatus of claim 1 wherein the means for producing an incident beam of radiation is of the laser type and the beam is substantially coherent and monochromatic.

5. The apparatus of claim 1 wherein the first, second, third and fourth impressing means each includes means for impressing a potential generally parallel to the optic axes of each of the crystals of the selected cells to produce the phase change recited for each cell.

6. Apparatus for generating a display pattern composed of selected radiation elements of a matrix of such elements comprising means for producing a beam of polarized radiation, a plurality of sets of electro-optic cells disposed successively along said beam, each cell comprising at least a pair of crystals coextensive, along the beam, and each set of cells forming a matrix of cells with each cell of the matrix passing one of said radiation elements, corresponding cells of successive sets being coextensive along the beam, and polarizing means disposed in succession in the path of said beam, and means connected to selected cells coextensive in said beam, of all said sets for impressing voltages selectively on said selected cells to produce said display pattern.

7. The apparatus of claim 6 wherein the polarizing means including a first polarizer interposed between the sets and a second polarizer interposed in the path of the resulting radiation emitted by the last set in the path of the beam, the planes of polarization of the first and second polarizers being crossed, the voltage impressed on the crystals of the cells of the sets being coordinated with the said plane of polarization to produce the display pattern.

8. The apparatus of claim 7 wherein the polarization of the first polarizer is the same as the polarization of the beam produced by the producing means.

9. The apparatus of claim 7 wherein the voltage is impressed simultaneously on coextensive crystals in the path of the beam.

10. Apparatus for generating a display in a matrix array of radiation including an incident beam of plane polarized radiation, a first array of electro-optic cells on which said beam is incident and which sub-divides said beam into elements of a matrix of first resulting radiation, each said elements being passed by one of said cells, means impressing voltages on selected ones of said cells, for polarizing first elements of said first resulting radiation passed by said cells in a plane at right angles to the plane of polarization of the incident radiation, and on second selected ones of said cells for polarizing second elements of said first resulting radiation passed by said last-named cells so that said second elements remain polarized in the plane of polarization as said incident beam, a polarizer interposed in the path of said first resulting radiation passing only plane polarized radiation polarized in the same plane as said incident beam, said polarizer passing said second resulting radiation, a second array of electro-optic cells interposed in the path of said second resulting radiation, the cells of said second array being coextensive along the beam with corresponding cells of said first array and each cell of said second array passing an element of second resulting radiation which is passed by the corresponding cell of the first array, whereby said second array preserves the matrix of radiation produced by said first array, said second array passing a third resulting radiation, means impressing voltages only on first selected cells of said second array which are coextensive with the second selected cells of said first array for polarizing the strips of radiation passed by said second selected cells of said second array at right angles to the polarization of the incident beam, and a polarizer interposed in the path of the third resulting beam passing only radiation polarized at right angles to the polarization of the incident beam.

11. Apparatus for generating a display comprising means for producing a beam of linearly-polarized incident radiation, having interposed therein in succession; a first matrix of radiation-modulating cells formed of a first pair of arrays of electro-optic crystals, the crystals of one array of said pair being crossed with respect to the crystals of the other array of said pair and having their respective electro-optic axes substantially at right angles to the beam and to the crystals of the other array of said pair; and a second matrix of radiation-modulating cells formed of a second pair of arrays of electro-optic crystals, the crystals of one array of said second pair being crossed with respect to the crystals of the other array of said second pair, and having their respective electro-optic axis substantially at right-angles, to the beam and to the crystals of said second pair; corresponding cells of the first and second matrices being interposed in said beam coextensively, whereby said matrices subdivide said beam into a matrix of potentially radiating elements; a first linear polarizer passing linearly polarized radiation having the same plane of polarization as said incident radiation interposed in said beam between said first and second cell matrices; a second linear polarizer passing linearly polarized radiation having a plane of polarization at right angles to said plane of the incident radiation interposed in the beam emerging from said second matrix; means for impressing voltages on selected crystals of each of the first pair of arrays shifting the plane of polarization of the elements of radiation passing through said selected crystals by substantially 90°, whereby the planes of polarization of those of said last-named elements passed by crystals of cells formed by both arrays of said first pair are shifted substantially by 180°; and means for impressing voltages on crystals of each array of said second pair which are coextensive with the crystals of the corresponding arrays of said first pair, said voltages shifting the plane of polarization of those elements of said radiation passed by both of cells formed by said last-named crystals of said second pair by substantially 90°, whereby only the said elements of radiation shifted by 180° by said first pair of arrays are passed by said second pair of arrays.

12. Apparatus for producing a radiant display including means for producing a beam of radiant energy; a first matrix of electro-optic cells, said first matrix comprising a first array of electro-optic crystals and a second array of electro-optic crystals, the crystals of each array being disposed in the path of said beam with their electro-optic axes at right angles to said beam, the crystals of the first array being disposed at an angle to the crystals of the second array, the cells being formed at the intersections of the projections of the first crystals on the second crystals; a second matrix of electro-optic cells said second matrix being formed of a third array of electro-optic crystals and a fourth array of electro-optic crystals, the crystals of each said last-named arrays being disposed in the path of said beam with their electro-optic axes at right angles to said beam, the crystals of said third array being disposed at an angle to the crystals of said fourth array which is substantially equal to the angles between the crystals of said first and second arrays, the cells of said second matrix being formed at the intersections of the projections of said crystals of said third array in the crystals of said fourth array, corresponding crystals of said first and third array being coextensive and corresponding crystals of the second and fourth arrays being coextensive, along the path of said beam, whereby corresponding cells of said first and second matrices are coextensive along the path of said beam, said first and second matrices subdividing said beam into a matrix of elements of radiant energy; radiant energy polarizer means interposed in the path of said beam; means connected to at least one crystal of said first array and at least one crystal of said second array for impressing voltages on both said last-named crystal to modulate in a predetermined manner that element of the matrix of said elements which is defined by the intersection of the projection of said one crystal of said first array on said one crystal of said second array, and means, connected at least to the crystals of said third array which is coextensive with the crystal of said first array, and at least to the crystal of said fourth array which is coextensive with the crystal of said second array, cooperative with said polarizer means, for suppressing the elements of said matrix of elements defined by the intersection of the projection of said one crystal of said first array on crystals, other than said one crystal, of said second array, and by the intersections of the projections of said one crystal of said second array on the crystals, other than said one crystal, of said first array, and for transmitting the element of said matrix of elements defined by the intersection of the projection of said one crystal of said first array and said one crystal of said second array.

\* \* \* \* \*

UNITED STATES PATENT OFFICE
CERTIFICATE OF CORRECTION

Patent No. 3,741,626        Dated  June 26, 1973

Inventor(s)  John L. Wentz

It is certified that error appears in the above-identified patent and that said Letters Patent are hereby corrected as shown below:

In the grant (ONLY) cancel columns 1 and 2 bearing Patent No. 3,740,819, and insert the corrected columns as shown on the attached sheet.

Signed and sealed this 29th day of October 1974.

(SEAL)
Attest:

McCOY M. GIBSON JR.            C. MARSHALL DANN
Attesting Officer              Commissioner of Patents

3,741,626

COMMUNICATION

CROSS REFERENCE TO RELATED PATENTS

U.S. Pat. No. 3,429,636 is incorporated herein by reference.

BACKGROUND OF THE INVENTION

This invention relates to the communication art and has particular relationship to communication by generating selected moving matrix arrays or patterns of radiation for use in display systems and in scanning, typically, optical display and scanning by a beam of light in the wavelength range between 0.2 microns and 20 microns. Many of the purposes for which such selected matrix arrays and patterns are uniquely suitable, because they can be more readily adapted than other facilities, demand that the scanning shall be over a wide field and at very high speeds and it is an object of this invention to provide for the generation of such suitable arrays and patterns.

In accordance with the teachings of the prior art particularly where large-field scanning is desirable a beam of radiation may be deflected to produce a scanning pattern by electro-mechanical devices. However, the frequency of scanning of which such devices are capable is inherently limited to lower magnitudes. Piezoelectric transducers can also be used for deflecting a beam of radiation to scan but with such device, the field or area of scanning must be maintained at very low magnitudes.

It is an object of this invention to overcome the disadvantages of the prior art and to provide communication apparatus and a method of communication in which intelligence is conveyed by causing a beam of radiation to scan to produce a predetermined moving, matrix or pattern and in the use and practice of which the scanning shall be carved out over large fields and at high, electric speeds.

SUMMARY OF THE INVENTION

In accordance with this invention, the scanning pattern is produced by arrays of electro-optic crystals or shutters such as are disclosed in U.S. Pat. No. 3,429,636. This patent discloses the cooperation of a pair of such crystals which are coextensive or aligned along a beam of light and which may be regarded as an electro-optic cell. Correspondingly the arrays of crystals in accordance with this invention cooperate in pairs, each pair being composed of a number of cells each cell including a pair of intersecting or coextensive or aligned crystals.

The radiation which is to form the desired matrix array or is to scan a region or area is passed through the arrays of cells. The scanning is produced by applying electric fields to selected crystals of the arrays, the field being switched from certain crystals to other crystals in each array in accordance with the desired matrix array or scanning pattern. To achieve high-speed change of the matrix array in high-speed scanning the changing impressing of voltage in the selected crystals is electrically controlled. The field or area of scan may be set to a large magnitude by providing arrays of crystals of appropriate dimensions. While this invention is uniquely advantageous embodied in apparatus in which the radiation beam is a coherent monochromatic beam derived from a laser, it is also applicable to systems in which the radiation is a collimated beam derived from an ordinary source. Where the radiation is derived from a laser beam the beam may be modulated by Q-spoiling as taught by Patent 3,429,636 to achieve the intelligence communication purpose of the apparatus.

In the practice of this invention the radiation is transmitted in succession through the cells or shutters of two sets of arrays of electro-optic crystals. All crystals are disposed in the beam with their optic axes, or Z axes perpendicular to the beam, and with the optic axes of the crystals of an array of each set perpendicular to the optic axes of the crystals of the other array. The radiation incident on the first array of the first set is polarized and the resulting radiation emitted by the last array in the succession of each set is passed through a polarizer. Voltage is impressed on selected crystals of the arrays which is of such magnitude and is so controlled that at each array the polarization of the radiation in selected portions of the cross section of the incident radiation on each array is changed. The changes are so coordinated with each other and with the planes of polarization of the polarizers that the portions of the resulting beam emitted by the last polarizer have a predetermined matrix array. The matrix array can be subjected to time variation by suitable variation of the voltages impressed on the crystals to produce a high-speed scanning operation over a large area.

Typically this invention may be applied to a radar system. In this case the beam of radiation is appropriately modulated to produce pulses and the voltages on the crystals are varied so that the region under observations are scanned by impingement of successive portions of the beam. Resulting radiation reflected from objects in the region under observation is processed by a radiation receiver synchronized and coordinated with the control of the voltages which produce the transmitted radiation.

The invention may also be to serve for high-speed printing. In this case the crystals are controlled so that the portions of the beam emitted by the last polarizer form symbols such as letters or numbers. The radiation emitted by these portions, particularly if it is derived from a laser, may record the symbols onto a tape or the like.

BRIEF DESCRIPTION OF THE DRAWING

Figure 4:
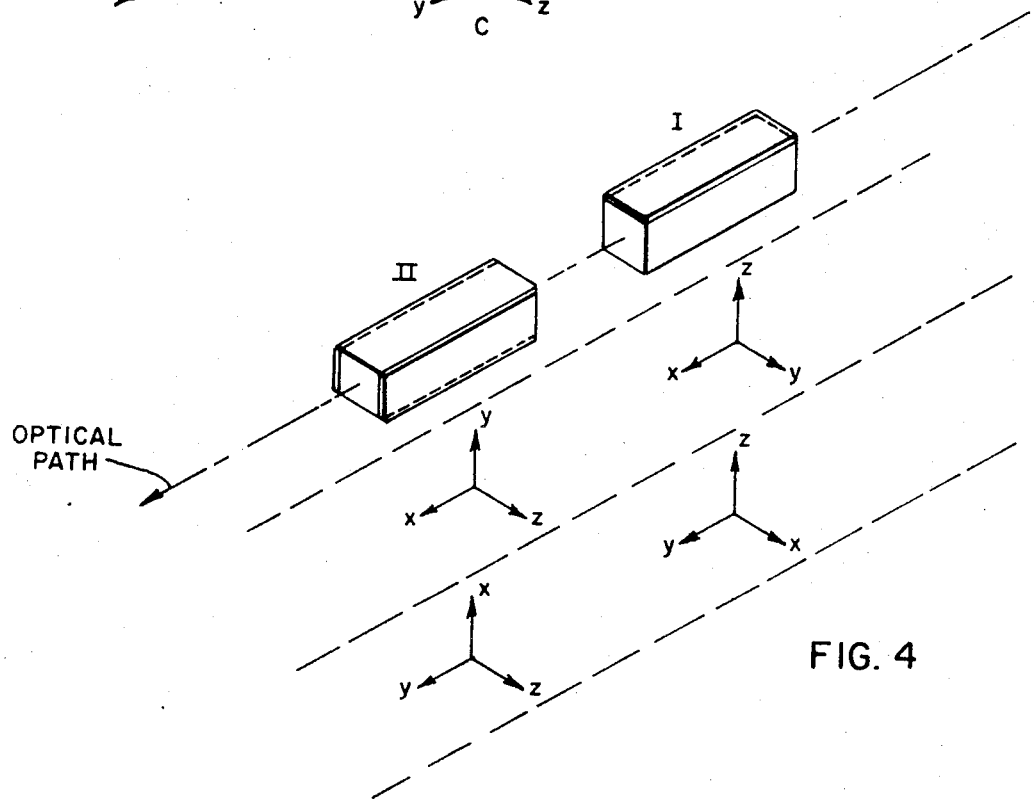

For a better understanding of this invention, both as to its organization and as to its method of operation, together with additional objects and advantages thereof, reference is made to the following description taken in connection with the accompanying drawings; in which:

FIG. 1 is a diagrammatic view showing an embodiment of this invention;

FIG. 2 is a fragmental view of FIG. 1 showing how this invention may be practiced to produce matrix arrays which change at a high rate or to produce high speed scanning;

FIGS. 3 and 4 show different orientations of crystals of typical cells and serve the purpose of explaining the practice of this invention;

FIGS. 5, 6 and 7 show the manner in which the changes in polarization are produced; and FIGS. 8A and 8B show matrix patterns produced when this invention is applied to high speed printing.

DETAILED DESCRIPTION OF INVENTION

The apparatus shown in FIG. 1 includes a laser source 11, as disclosed in Patent 3,429,636 for produc-